United States Patent

[11] 3,552,389

[72] Inventors Martin Allgower;
Stefan Perren, Chur; Max E. Russenberger, Schaffhausen, Switzerland
[21] Appl. No. 646,542
[22] Filed June 16, 1967
[45] Patented Jan. 5, 1971
[73] Assignee Synthes AG
Chur, Switzerland
[32] Priority June 22, 1966
[33] Switzerland
[31] No. 9068/66

[54] OSTEOSYNTHETIC PRESSURE PLATE CONSTRUCTION
10 Claims, 12 Drawing Figs.

[52] U.S. Cl..................................................... 128/92,
90/14
[51] Int. Cl...................................................... A61f 5/04
[50] Field of Search............................................ 128/92,
92D, 92B, 92E2, 83; 90/(Inquired)

[56] References Cited
OTHER REFERENCES

" Factors in the Choice of Material for Bone Plates & Screws" by C. S. Venable, Surgery, Gynecology & Obstetrics, Vol. 74, 1942, pages 541—545. 128-92D " Zimmer Bone Plates and Screws for Bone Sugery," The Journal of Bone & Joint Surgery, July 1949, Advertisement page 5.

" Stotted Pattern SMO Plates," Zimmer Orthopedic & Equipment Catalog, Zimmer Mfg. Co., Warsaw, Ind. 1950.

" A Probe-Pointed Tap," The Lancet, Feb. 13, 1954, pages 346—347. 128-92B

Primary Examiner—Richard A. Gaudet
Assistant Examiner—Ronald L. Frinks
Attorney—McGlew and Toren ABSTRACT: An osteosynthetic pressure plate includes a slot formation for receiving a bone-fixing screw which is adapted to be secured to a bone part which is to be mended. The slot is formed with an edge which includes an oblique portion or ramp having an inclination such that when it is engaged by the underside of a head portion of a bone-fixing screw there will be a displacement of the pressure plate in a direction to move the ramp portion away from the fixing screw and to cause the plate to apply a pressure to hold the bone parts in tight engagement. The plate is advantageously useable with screws having heads of spherical form or conical form, for example. The inclination of the ramp and the configuration of the walls bounding the slot of the pressure plate are such that there will be a uniform and even shifting of the plate having the slot when the ramp of the walls bounding the slot is engaged by the screw head to cause the desired displacement of the pressure plate in order to displace the bone fragment toward tighter engagement with the adjacent bone fragment and into pressure engagement therewith.

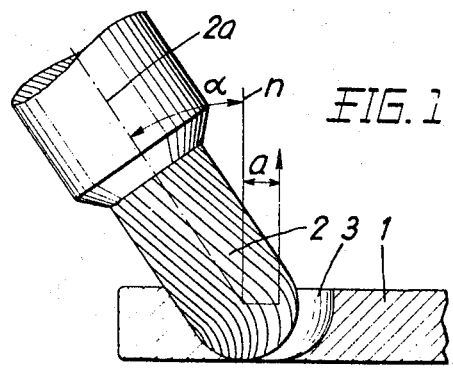
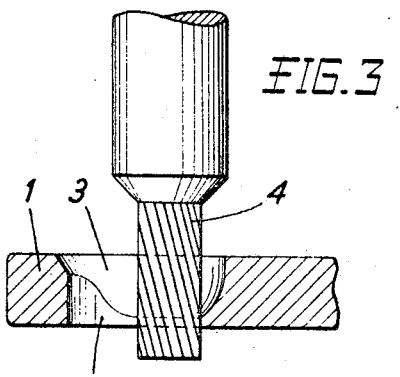
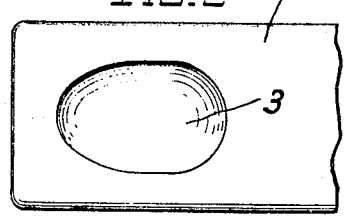
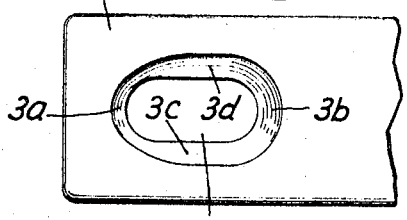
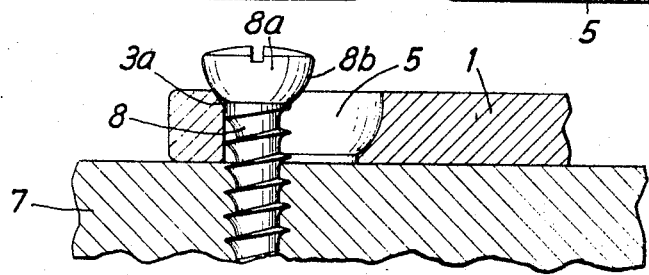
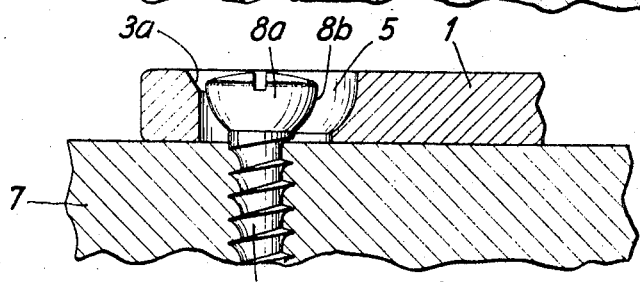
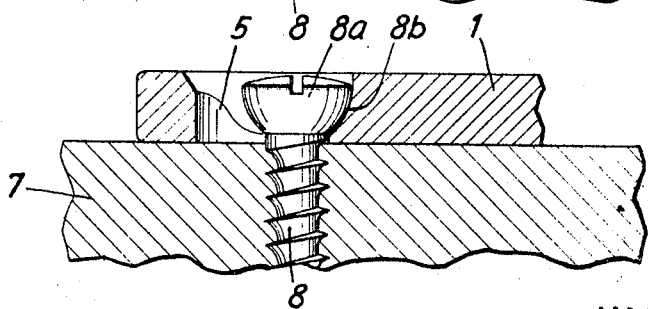

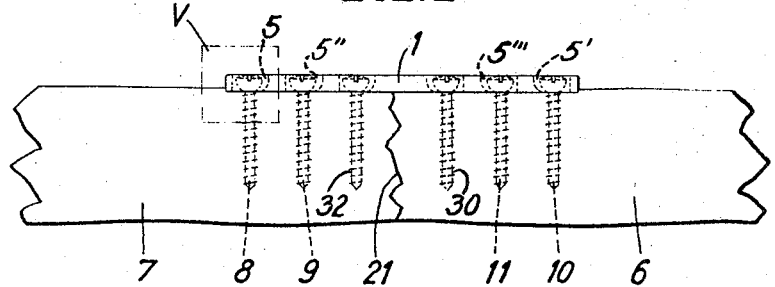
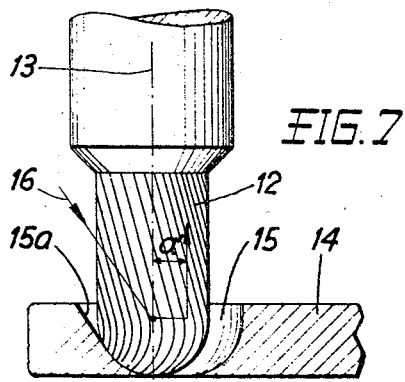
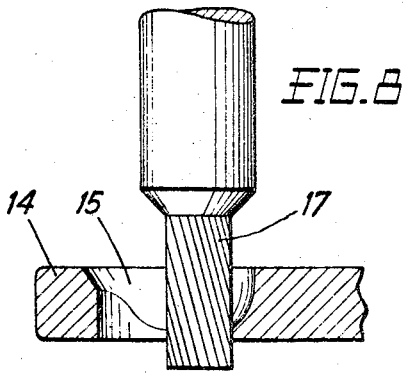
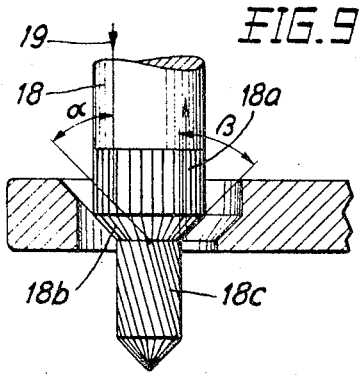
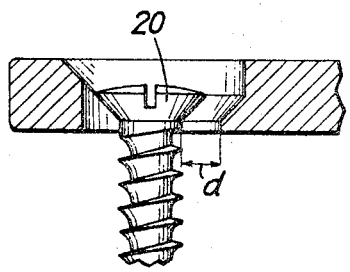
INVENTORS
MARTIN ALLGÖWER
STEFAN PERREN
MAX RUSSENBERGER

OSTEOSYNTHETIC PRESSURE PLATE CONSTRUCTION

SUMMARY OF THE INVENTION

This invention relates, in general, to devices for joining broken bones and, in particular, to a new and useful pressure plate which is adapted to be fixed to two bone parts in order to hold these parts together, the plate being displaceable by a bone-fixing screw in order to hold the bone parts together under pressure.

The invention provides an osteosynthetic pressure plate which may be applied to bone parts which have been broken for the purpose of holding the parts together under pressure. In the practice of compression osteosynthesis, the use of pressure plates has been known for a long time as is evident from the relevant literature, for example, the textbook "Technik der operativen Frakturenbehandlung " by Muller, Allgower and Willenegger (1963 ) page 53 et seq. Various types of plates are described therein and it is also explained why a considerable pressure effect must be exerted upon the two fractured surfaces. With the known devices, some type of auxiliary means must be employed to produce the desired pressure between the two parts of the fractured surfaces. Such means usually constitute a clamp which must be secured to one of the bone fragments such as by threaded screws. In this manner, the plate screwed to other fragment can be drawn in toward the clamp in order to press the two fragments together. Thereafter the plate is then secured to the second bone fragment using threaded screws and the clamp device is removed. A disadvantage of such a device in addition to its complicated arrangement is that it requires an operational wound which is substantially longer than the plate itself and it necessitates an additional damage to the bone fragment for the purpose of fixing the clamp. In addition, because of the clearance necessary for securing the plate to the second bone fragment, the pressure plate after it is fully secured by the threaded screws can exert only a fraction of the pressure which was exerted upon the fractured surface by means of the clamp.

In accordance with the present invention, there is provided an osteosynthetic pressure plate which includes slots through which countersunk bore screws are directed which is formed by walls which cause a displacement of the plate when the securing screw head contacts a portion of the surrounding walls so that the securing of the plate by the threaded screws will also effect a tight pressure displacement of the affected broken parts to hold those parts under engaged pressure contact. A pressure plate of this nature, includes at least one screw hole which is formed with a slot which is elongated in the direction of the longitudinal axis of the plate so that the plate will be shifted relatively along this axis when the threaded securing screw is inserted there through and into the bone part. The slot is formed with a wall defining a ramp or inclined plane which engages beneath the head of the securing screw and which causes a relative movement between the screw and the plate when the screw is turned downwardly thereon in order to secure the plate to the bone. The slot may advantageously provide a limiting abutment stop at the end of the slot which is designed so that the screw head has been sunk but still does not rigidly clamp the plate, the plate can be pushed back and forth with respective to the screw head. The inclination of the ramp portion is such that the plate will be shifted when used with screw heads of ordinary spherical form or conical form for example. The total amount of longitudinal clearance or elongation of such slots will depend upon the number provided on each pressure plate to give the desired plate displacement for the compression of the fracture. For example, only two such slots may be provided, one of each is to accommodate a threaded screw element for securing the plate to one bone element which is to be held together. The other bone element will then receive a securing screw which is directed through the slot having the ramp-deflecting edge so that when the screw is driven home the plate will be displaced in a direction to cause the plate to move with the other secured bone fragment toward the one which is being secured in order to tightly compress these two fragments together. Additional slot openings may be provided of sufficient elongation to permit, and of a construction to cause a displacement on the bone elements toward each other in incremental steps. In this manner, each additional screw which is secured will cause a displacement of its associated bone element toward the other by a fixed amount which in total will provide the necessary pressure force on the affected bone ends joined together by the plate.

Accordingly, it is an object of the invention to provide a pressure plate for mending broken or fractured bones which is adapted to be secured to the fragments by threaded screws wherein the slot opening for at least one threaded screw is shaped so that the plate is displaced by engagement of the head of the screw with the walls bounding the opening in order that the associated bone parts may be moved together in pressure contact.

A further object of the invention is to provide an osteosynthetic pressure plate which is displaceable upon attachment of the plate to a bone part for the purposes of holding the bone parts in pressure contact.

A further object of the invention is to provide a pressure plate for fixing bone parts which is simple in design, rugged in construction and economical to manufacture.

The various features which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

In the drawings:

FIG. 1 is an enlarged partial section of a pressure plate indicating a tool in position for forming a slot therein in accordance with the invention;

FIG. 2 is a top plan view of the plate of FIG. 1 after it is formed by the tool shown in FIG. 1;

FIG. 3 is a view similar to FIG. 1 showing the tool for finishing the slot;

FIG. 4 is a view similar to FIG. 2 showing the completed slot of the plate constructed in accordance with the invention;

FIGS. 5a, 5b and 5c are partial enlarged sectional views of a bone part showing the steps of displacement of the pressure plate as the threaded screw is driven into the part;

FIG. 6 is a partial elevational view on a reduced scale showing two bone parts held together by a pressure plate constructed in accordance with the invention;

FIG. 7 is an enlarged sectional view similar to FIG. 1 indicating initial formation of the walls of a pressure plate for a securing screw having a conical head;

FIG. 8 is a view similar to FIG. 3 showing the complete formation of the slot in the pressure plate;

FIG. 9 is an enlarged sectional view of a pressure plate formed by a tool for effecting the complete slot formation for a conically tapered screw head; and FIG. 10 is an enlarged partial sectional view of a pressure plate for a conically headed secured screw with the screw in a secured position.

DETAILED DESCRIPTION

Referring to the drawings, in particular, in FIGS. 1 and 2, there is indicated a tool 2 in position for initially forming the walls 3 in an osteosynthetic pressure plate 1 prior to the complete breaking through of a slot 5 which is accomplished as indicated in FIGS. 3 and 4. In accordance with the invention, one end of the slot is provided with an inclined surface or ramp 3a which is adapted to cooperate with the head of a securing screw for the purpose of displacing the plate 1 when it is being installed. For this purpose, a round headed miller 2 is employed as indicated in FIG. 1 which is arranged during the cutting so that its axis 2a makes an angle α of, for example, 30° to 40° with respect to the normal n to the plate surface. The miller 2 is first fed perpendicularly to the plate surface, that is, in the direction n and the movement is continued until the miller reaches the position indicated in FIG. 1 adjacent the lower side of the plate. This produces the formation of the ramp portion or inclined planar surface 3a which functions to cause a displacement of the plate 1 when it is contacted by the underside of a head of a securing screw for attaching the plate to a broken or fractured bone part.

Thereafter the miller 2 is displaced horizontally through the path as indicated in FIG. 1 to form the rear portion of the slot and the surface 3b and 3c and 3d and then it is removed in the direction n. This completes the formation of the cavity 3 indicated in FIG. 2. The longitudinal slot 5 is then formed as indicated in FIG. 3 using a cylindrical miller 4. When the work of the miller 4 is completed, the wall is broken through and of the surface 3 which was produced by the round headed mile miller 2 there remains only a marginal surrounding strip which comprises the cylindrical inclined surfaces 3a, 3b, 3c, and 3d. The inclined surface 3a forms the ramp or moving surface and the surface 3b provides an end abutment surface. The slot 5 is elongated in a longitudinal direction of the plate 1.

As indicated in FIG. 6, the plate 1 is secured to fractured bone parts 6 and 7 in order to hold these two parts together along a fracture line 21 using securing bolts 8, 9, 10 and 11 and additional bolts 30 and 32 if desired necessary.

In order to secure the fragments 6 and 7 together, the pressure plate 1 is placed over the fragment 6 and is secured to the fragment by means of the threaded securing screw 10 which are directed through respective ones of a plurality of receiving slots 5, 5′ and 5″, etc. The boring and the tapping of the bone 6 for the purposes of installing the screw 10 through the slot 5′ and into the bone is effected in a known manner. Thereafter, the fractured portions of the bone fragment 6 and 7 are correctly assembled to each other and then a threaded securing screw 8 is directed through its slot 5 and threaded into the bone fragment 7 following the steps indicated in FIGS. 5a, 5b and 5c which show an enlargement of the area indicated in FIG. 6.

In this embodiment, the securing screw 8 is provided with a hemispherical seating surface 8b on the underside of the head 8a. At the beginning of the driving in of the screw 8, the hemispherical surface 8b contacts the ramp or inclined 3a of the slot 5 as shown in FIG. 5a. Since the inclined surface 3a has a cylindrical shape with an axis 2q disposed at an angle α in respect to the normal n, the plate 1 will be pushed to the left upon the further driving in of the screw 8. This will proceed until the plate 1 is shifted to the left to the position indicated in FIG. 5b. In this manner, the two bone fragments 6 and 7 are pressed together, but the securing screw 8 is still not finally driven home.

In the next step, a screw 9 is inserted into its associated slot 5″ in the manner similar to the securing screw 8, it being positioned so that it contacts the inclined surface 3a of the slot, which is located on the end remote from the fracture line 21. The driving in of the screw 9 has a similar effect on the plate 1 displacing it relative to the bone fragment 7 so that the fragment 7 is urged toward the fracture line 21 with increased pressure. Because the screw 8 was situated before the driving of the screw 9 approximately in the center of its associated slot 5, the screw 8 will not obstruct the displacement of the plate 1 relative to the fragment 7 in the direction to the left as shown in the drawing of FIG. 6.

After the driving in of the screw 9, the screw 8 will be situated in a position at which its end contacts the abutment 8b formed at the end of the slot 5 as shown in FIG. 5c. If the pressure at the fractured joint 21 is still not great enough, it is possible by adding an additional securing screw 11 through slot 5‴ to cause a displacement of the plate 1 relative to the fragment 6 to cause a displacement of the plate 1 relative to this fragment in a direction to cause an increase in the pressure to the fractured joint 21. The slot 5‴ for the securing bolt 11, is, of course, shaped in an opposite manner to the slots 5 and 5″ to cause the desirable displacement of the bone fragment 6 to the left as indicated in FIG. 6.

The length of the individual slots 5, 5′, 5″, 5‴, etc. are such that due consideration is taken in the m amount of displacement of a plate 1 relative to the bone fragments which is desired during each screw installation. In the example indicated in FIGS. 5a, 5b and 5c, it is possible to achieve by only two screws on each side of the fracture line 21 a satisfactory displacement of the plate relative to the bone fragments 6 and 7 in order to produce the necessary compression force. If a larger compression of forces are required, and a longer displacement path than the distance a of FIG. 1 must be choosen correspondingly larger when making the slot. This is also true if it is still necessary to displace the bone fragments after the fitting screws have been installed in order to make possible a shortening of the fracture.

In FIGS. 7 and 8, there is indicated the formation of slot 15 using a round head mile miller 12 and a cylindrical miller 17 in a manner comparable to that used in FIGS. 1 and 3 for the formation of a slot for a conically headed screw. In this arrangement, the round headed miller 12 is oriented with its axis 13 normal to the surface of the workpiece 14. In order to produce the ramp portion 15a, the tool is fed not vertically but obliquely and in the direction of the arrow 16. As soon as the tool has assumed the position indicated in FIG. 7, and when the apex has penetrated the entire thickness of the workpiece, the tool is displaced through the path a′ parallel to the surface of the workpiece and is then removed from the workpiece in a vertical direction. By this operation, the same shape of cavity as obtained by the method of FIG. 1 is achieved. In a second working operation, the slot is milled by the cylindrical miller 17 as done in the previous embodiment.

While the above operations are described in respect to countersunk screws with hemispherical seating surfaces, it is also possible to design the screw seating for screws having a conical seating surface as may be seen by reference to FIGS. 9 and 10. In this latter instance, a miller 18 with two cylindrical parts 18a and 18c as well as an interconnecting conical part 18b is provided. The miller is fed during the machining of the workpiece in a vertical direction to such an extend that the upper edge of the conical part 18b lies in one plane with the surface of the workpiece. Then the tool is fed further in an oblique direction and in such a manner that the angle α which its direction of feed makes with the normal 19 is equal to the cone angle. The displacement of the tool in this direction should be carried out only until the lower edge of the conical part 18b of the tool 18 lies in one plane with the lower surface of the workpiece. Thereupon, the workpiece 14 is displaced through the path d parallel to the surface of the workpiece. The length of the path d corresponds to the length of the path a in the first two examples described. This length also determines the length of the displacement path by which the plate can be pushed back and forth when the screw head 20, indicated in FIG. 10, has been sunk to the position shown in which it still does not rigidly clamp the plate. The operation of the device with a conically headed screw 20 is the same as that as with the hemispherical headed screw.

While specific embodiments of the invention have been shown and described in detail to illustrate the application of the inventive principles, it will be understood that the invention may be embodied otherwise without departing from such principles.

We claim:

1. An apparatus for securing bone fragments together in pressure contact using screws at least one of which has a head with an inwardly tapered undersurface, comprising a plate having a top side and a bottom side and at least two spaced longitudinally elongated slot openings extending therethrough for receiving the screws which are adapted to pass through the slot openings to engage into respective bone fragments, said plate having a wall bounding at least one of said slot openings which is inclined at an angle from said top side toward said bottom side to cause shifting of the plate in a direction to move the bone fragments together when engaged by the tapered undersurface of the head of the screw as said plate is being secured to its respective bone fragment, said inclined wall of said slot extending from said top surface inwardly and downwardly towards said bottom surface and defining an inclined planar surface from one end of the slot to the other which is displaceable by the tapered undersurface of the screw head when it is advanced into its respective bone fragment.

2. An apparatus, according to claim 1, including a threaded screw engaged through each slot opening adapted for insertion into a respective bone fragment.

3. An apparatus according to claim 1, wherein the wall of said plate bounding said slot opening which is inclined includes a portion opposite the inclined portion forming an abutment stop shaped to the configuration of the screw head.

4. An apparatus according to claim 1, including a threaded securing screw engaged through each slot opening adapted for insertion into a respective bone fragment and having a hemispherical countersunk head, said inclined wall portion comprising a surface complementary to said screw head and having an axis inclined to the plane of said plate.

5. An apparatus, according to claim 1, including a securing screw adapted to extend through each of said slot openings and to be threaded into the respective bone fragments and having a conically-shaped countersunk head, the inclined wall portion of said plate being formed as a conical surface.

6. An apparatus, according to claim 1, including at least one slot adapted to be located on each side of the fracture line of said bone fragments, and a threaded securing screw engaged through at least one of the slots adapted to be located on each side of the fracture line and adapted to be threaded into the respective bone fragment.

7. An apparatus, according to claim 6, wherein at least one of said slots is elongated sufficiently to permit an initial shifting of the plate upon contact of the inclined surface by the securing screw and an additional movement, and wherein at least one other slot is provided with an inclined wall portion engageable by a threaded securing screw for effecting additional movement of said plate.

8. An apparatus, according to claim 1, wherein said pressure plate includes at least two slot openings adjacent each end adapted to be oriented over the respective bone fragments adjacent each end, the slots having walls at the ends adjacent the respective ends of said plate inclined at an angle to cause shifting of the plate in the direction to move the bone fragments together when contacted by a securing screw and having at their opposite ends formed with an abutment complementary to the configuration of the bone-securing screw which is to be employed.

9. An apparatus, according to claim 1, including at least one slot adjacent one end of said plate and at least two additional slots adjacent the opposite end of said plate which are each elongated in a direction parallel to the longitudinal axis of said plate end which form an inclined portion arranged at an angle to cause relative shifting of the plate in directions toward the associated adjacent end, at least one of said slots adjacent one of said plate ends being elongated sufficiently to permit a shifting of said plate after it is threadedly secured by the associated screw after the tightening of the threaded securing screw in the other of said slots.

10. An apparatus, according to claim 1, wherein said inclined wall begins at one end of said slot which is inclined from said top surface inwardly and downwardly towards said bottom by a lesser distance than the remaining portions of said inclined wall bounding said slot.